(12) United States Patent
Tsai

(10) Patent No.: US 10,346,567 B2
(45) Date of Patent: Jul. 9, 2019

(54) METHOD AND APPARATUS FOR PERFORMING BATTERY CELL CONTROL WITH AID OF VIRTUAL BATTERY MECHANISM

(71) Applicant: Fu-Sheng Tsai, Taoyuan (TW)

(72) Inventor: Fu-Sheng Tsai, Taoyuan (TW)

(*) Notice: Subject to any disclaimer, the term of this patent is extended or adjusted under 35 U.S.C. 154(b) by 375 days.

(21) Appl. No.: 15/451,379

(22) Filed: Mar. 6, 2017

(65) Prior Publication Data
US 2017/0177768 A1 Jun. 22, 2017

Related U.S. Application Data

(63) Continuation-in-part of application No. 13/940,259, filed on Jul. 12, 2013, now abandoned.

(60) Provisional application No. 61/671,099, filed on Jul. 13, 2012.

(51) Int. Cl.
  *G06F 17/50* (2006.01)
  *H01M 10/42* (2006.01)
  *H02J 7/00* (2006.01)

(52) U.S. Cl.
  CPC .... *G06F 17/5009* (2013.01); *H01M 10/4285* (2013.01); *G06F 17/50* (2013.01); *G06F 2217/78* (2013.01); *H02J 7/0063* (2013.01)

(58) Field of Classification Search
  CPC .................................................. G06F 17/5009
  USPC ............................................................. 703/18
  See application file for complete search history.

(56) References Cited

PUBLICATIONS

Qing et al.: Hardware-In-Loop Test Platform for Electric Vehicle Cell Battery Management System; Applied Mechanics and Materials; vol. 29-32; pp. 2398-2403; Aug. 13, 2010. (Year: 2010).*

* cited by examiner

*Primary Examiner* — Hugh M Jones
(74) *Attorney, Agent, or Firm* — Winston Hsu

(57) ABSTRACT

A method for performing battery cell control with aid of virtual battery mechanism includes the steps of: receiving a total output voltage level of a set of battery cells connected in series between a first battery control terminal and a second battery control terminal; generating a virtual total output voltage level according to the total output voltage level, and inputting the virtual total output voltage level to a third battery control terminal, wherein the virtual total output voltage level simulates an output voltage level of connecting the set of battery cells and at least one virtual battery cell in series; generating a supply voltage according to the total output voltage level to maintain generation of the virtual total output voltage level; and utilizing a battery cell control chip within a power supply device to control operations of the set of battery cells according to the virtual total output voltage level.

19 Claims, 10 Drawing Sheets

METHOD AND APPARATUS FOR PERFORMING BATTERY CELL CONTROL WITH AID OF VIRTUAL BATTERY MECHANISM

CROSS REFERENCE TO RELATED APPLICATIONS

This is a continuation-in-part of U.S. application Ser. No. 13/940,259 (filed on Jul. 12, 2013), which claims the benefit of U.S. provisional application No. 61/671,099 (filed on Jul. 13, 2012). The entire contents of the related applications are included herein by reference.

BACKGROUND OF THE INVENTION

1. Field of the Invention

The disclosed embodiments of the present invention relate to a power supply device, and more particularly, to a method for performing battery cell control with aid of virtual battery mechanism and a related apparatus.

2. Description of the Prior Art

Conventional battery cell control chips are designed to control a designated number of battery cells. For example, a first battery cell control chip of the conventional battery cell control chips may be applied to control three to six battery cells. In another example, a second battery cell control chip of the conventional battery cell control chips may be applied to control five to eight battery cells.

As the designated quantity (i.e. the designated number of battery cells) is unchangeable in a chip product, certain problems may occur. More specifically, each of the first and second battery cell control chips may provide a unique and excellent function. In the design of a conventional power supply device (e.g. a redundant power supply), once output specifications of a battery module are determined, a number of battery cells of the battery module is determined. Hence, when one of the first and second battery cell control chips is excluded from the conventional power supply device because of the unsupported number of battery cells, the corresponding unique and excellent function cannot be introduced into the conventional power supply device.

For example, the second battery cell control chip may include an electrically erasable programmable read-only memory (EEPROM) to provide a parameter updating function, while the first battery cell control chip does not provide the parameter updating function. When the power supply manufacturer determines the number of battery cells to be four (or an integer less than four) and tries to design a power supply device with the parameter updating function, the power supply manufacturer may find out that neither one of the first and second battery cell control chips is applicable. After taking various factors (e.g. material and labor costs, and the rest of the conventional battery cell control chips) into consideration, the power supply manufacturer may have no choice but to give up implementing the parameter updating function, resulting in obstruction to industrial development. Thus, a novel method is needed to improve the use of the conventional battery cell control chips without introducing undesirable side effects.

SUMMARY OF THE INVENTION

It is therefore one objective of the present invention to provide a method for performing battery cell control with aid of virtual battery mechanism and a related apparatus to solve the above problems.

It is therefore another objective of the present invention to provide a method for performing battery cell control with aid of virtual battery mechanism and a related apparatus to improve the use of conventional battery cell control chips without introducing undesirable side effects.

According to a preferred embodiment of the present invention, an exemplary method for performing battery cell control with aid of virtual battery mechanism is disclosed. The exemplary method is applied to a power supply device. The exemplary method comprises the following steps: receiving a total output voltage level of a set of battery cells connected in series between a first battery control terminal and a second battery control terminal of a battery cell control chip within the power supply device; generating a virtual total output voltage level according to the total output voltage level, and inputting the virtual total output voltage level to a third battery control terminal of the battery cell control chip different from the second battery control terminal, wherein the virtual total output voltage level simulates an output voltage level of connecting the set of battery cells and at least one virtual battery cell in series between the first battery control terminal and the third battery control terminal; generating a supply voltage according to the total output voltage level, and maintaining generation of the virtual total output voltage level according to the supply voltage; and utilizing the battery cell control chip within the power supply device to control operations of the set of battery cells according to the virtual total output voltage level.

Besides the above method, an associated apparatus for performing battery cell control with aid of virtual battery mechanism is also provided correspondingly. The exemplary apparatus comprises at least a portion of a power supply device. The exemplary apparatus comprises a battery cell control chip, a virtual battery cell simulation circuit and a supply voltage generator. The battery cell control chip comprises a first battery control terminal, a second battery control terminal and a third battery control terminal, and is arranged for controlling operations of a set of battery cells connected in series between the first battery control terminal and the second battery control terminal according to a virtual total output voltage level, wherein the virtual total output voltage level simulates an output voltage level of connecting the set of battery cells and at least one virtual battery cell in series between the first battery control terminal and the third battery control terminal. The virtual battery cell simulation circuit is electrically connected to the battery cell control chip, and is arranged for receiving a total output voltage level of the set of battery cells connected in series between the first battery control terminal and the second battery control terminal, generating the virtual total output voltage level according to the total output voltage level, and inputting the virtual total output voltage level to the third battery control terminal. The supply voltage generator is electrically connected to the virtual battery cell simulation circuit, and is arranged for generating a supply voltage according to the total output voltage level, and maintaining generation of the virtual total output voltage level according to the supply voltage.

According to at least one embodiment of the present invention, an exemplary method for performing battery cell control with aid of virtual battery mechanism is disclosed. The exemplary method is applied to a power supply device. The method comprises the following steps: utilizing breakdown voltage characteristics of a Zener diode to generate a virtual total output voltage level, wherein the virtual total output voltage level simulates an output voltage level of connecting a set of virtual battery cells in series; generating a supply voltage to maintain generation of the virtual total output voltage level; and utilizing a battery cell control chip within the power supply device to control operations of the set of virtual battery cells according to the virtual total output voltage level. In one embodiment, the exemplary method further comprises the following step: using a voltage divider circuit to perform voltage division according to the virtual total output voltage level in order to generate a voltage level required by at least one control terminal of the battery cell control chip, wherein the voltage level is provided for simulating the operations of the set of virtual battery cells.

It is an advantage of the present invention that the method and apparatus for performing the battery cell control with the aid of the virtual battery mechanism are not limited by the aforementioned designated quantity, and may make unavailable options of the conventional battery cell control chips become available. A power supply device implemented according to the proposed method and apparatus may have a corresponding unique and excellent function (e.g. the parameter updating function). Therefore, the proposed method and apparatus are beneficial for testing, error correction, manufacturing and/or installation of the power supply device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
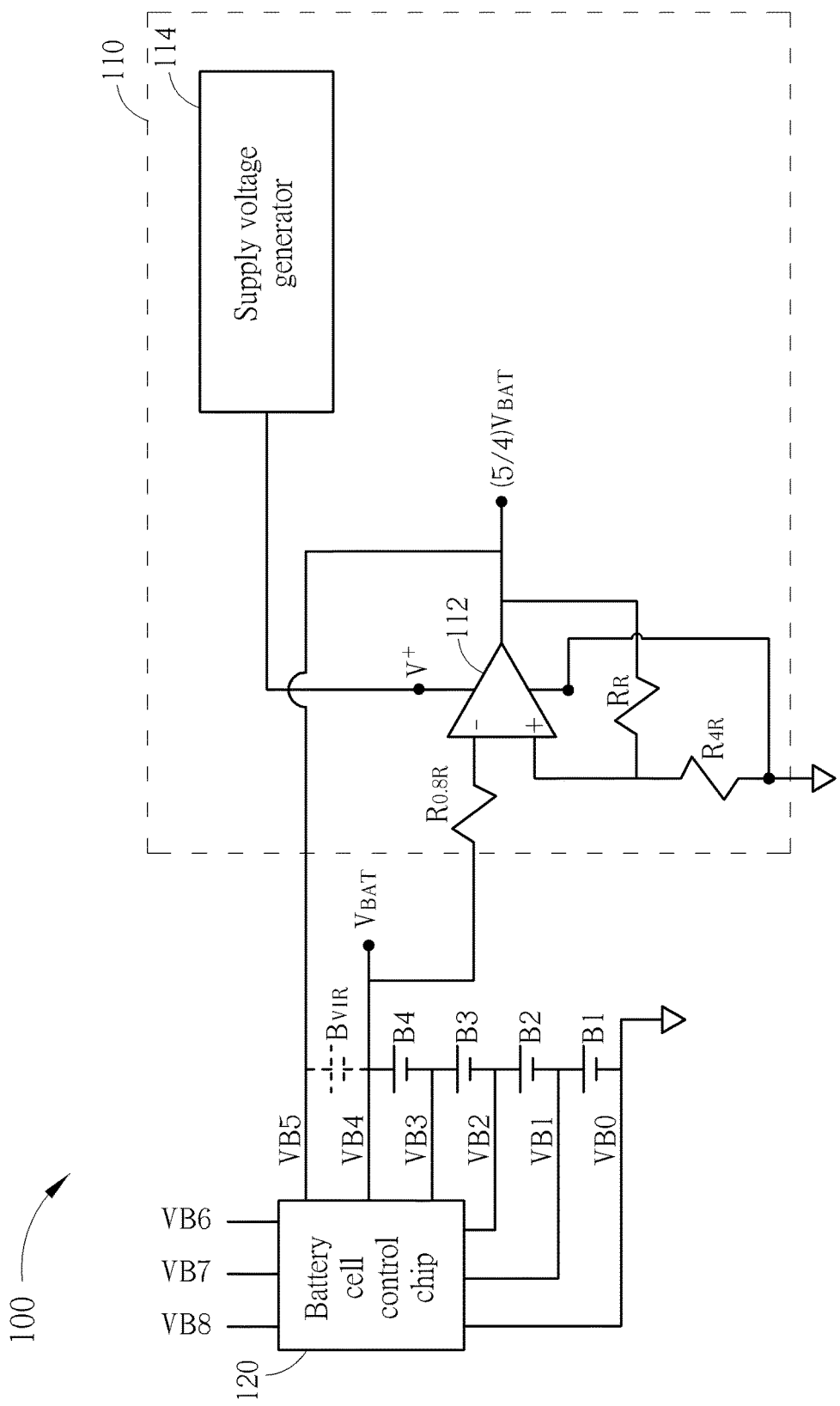
FIG. 1 is a diagram illustrating an exemplary apparatus for performing battery cell control with aid of virtual battery mechanism according to a first embodiment of the present invention.

FIG. 1 is a diagram illustrating an exemplary apparatus 100 for performing battery cell control with aid of virtual battery mechanism according to a first embodiment of the present invention. The apparatus 100 may include at least a portion (e.g. a portion or all) of a power supply device, wherein the power supply device may be, for example but not limited to, a redundant power supply. In one example, the apparatus 100 may represent an electrical system within the power supply device, and the electrical system may include a control circuit of the power supply device. In another example, the apparatus 100 may represent the whole power supply device. This is for illustrative purposes only, and is not meant to be a limitation of the present invention. According to a variation of the embodiment, the apparatus 100 may represent all parts of the electrical system excluding batteries (e.g. the aforementioned control circuit). According to another variation of the embodiment, the apparatus 100 may represent a system including the power supply device, wherein the power supply device is a subsystem of the system.

As shown in FIG. 1, the apparatus 100 may include a set of battery cells {B1, B2, B3, B4} connected in series, a virtual battery cell simulation circuit 110 and a battery cell control chip 120. The battery cell control chip 120 may include a set of control terminals {VB0, VB1, VB2, VB3, VB4, VB5, VB6, VB7, VB8}, wherein the control terminals VB4 and VB5 are electrically connected to the virtual battery cell simulation circuit 110, respectively; the control terminals VB0, VB1, VB2, VB3 and VB4 are electrically connected to terminals of individual battery cells of the set of battery cells {B1, B2, B3, B4}, respectively; and the control terminals VB6, VB7 and VB8 are idle and unused. Additionally, the virtual battery cell simulation circuit 110 may include an operational amplifier (OP-AMP or OPAMP) 112 and a plurality of resistors, and further include a supply voltage generator 114, wherein the resistors are electrically connected to the OP-AMP 112.

Specifically, the OP-AMP 112 may include a first input terminal (which is a negative input terminal and labeled "−" in this embodiment), a second input terminal (which is a positive input terminal and labeled "+" in this embodiment) and an output terminal (which is a terminal for outputting a voltage of (5/4) $V_{BAT}$ in this embodiment). The resistors may include a first resistor (e.g. a resistor $R_R$), a second resistor (e.g. a resistor $R_{4R}$) and a third resistor (e.g. a resistor $R_{0.8R}$). As shown in FIG. 1, two terminals of the first resistor (e.g. the resistor $R_R$) are electrically connected to the second input terminal and the output terminal of the OP-AMP 112, respectively, two terminals of the second resistor (e.g. the resistor $R_{4R}$) are electrically connected to the second input terminal and a reference voltage level (i.e. a reference voltage level of a reference terminal below the OP-AMP 112 shown in FIG. 1) of the OP-AMP 112, respectively, and two terminals of the third resistor (e.g. the resistor $R_{0.8R}$) are electrically connected to the first input terminal of the OP-AMP 112 and the control terminal VB4, respectively. As the reference voltage level is a ground level in this embodiment, the reference terminal below the OP-AMP 112 shown in FIG. 1 is electrically connected to a ground terminal. In one example, resistance values of the resistors $R_R$, $R_{4R}$ and $R_{0.8R}$ may be R, 4R and 0.8R, respectively, wherein the resistance value R is a predetermined resistance value. In practice, the resistance values of the resistors $R_R$, $R_{4R}$ and $R_{0.8R}$ may be 499K ohms, 2M ohms and 402K ohms, respectively, wherein the symbols "K" and "M" denote $10^3$ and $10^6$, respectively. Additionally, a predetermined number of battery cells (e.g. the aforementioned designated quantity) supported by the battery cell control chip 120 is greater than a number of battery cells of the set of battery cells {B1, B2, B3, B4}. For example, the battery cell control chip 120 may be used to control five to eight battery cells, wherein the predetermined number of battery cells may be an integer between 5 and 8. Please note that, to facilitate understanding of technical features of the present invention, FIG. 1 illustrates a virtual battery cell $B_{VIR}$, wherein the virtual battery cell $B_{VIR}$ actually does not exist in the apparatus 100 so that the virtual battery cell $B_{VIR}$ is drawn with dashed lines. Although the predetermined number of battery cells is greater than the number of battery cells of the set of battery cells {B1, B2, B3, B4}, the battery cell control chip 120 may be cheated with the aid of operations of the virtual battery cell simulation circuit 110, and operate normally as if the virtual battery cell $B_{VIR}$ existed in the apparatus 100.

In this embodiment, the virtual battery cell simulation circuit 110 is arranged to generate a virtual total output voltage level ($(5/4) V_{BAT}$) according to a total output voltage level $V_{BAT}$ of the set of battery cells {B1, B2, B3, B4} connected in series within the power supply device, wherein the virtual total output voltage level ($(5/4) V_{BAT}$) simulates an output voltage level of connecting the set of battery cells {B1, B2, B3, B4} and at least one virtual battery cell in series, and the at least one virtual battery cell is the single virtual battery cell $B_{VIR}$. In one example, if a typical value for the total output voltage level $V_{BAT}$ is 12.8V, the corresponding virtual total output voltage level ($(5/4) V_{BAT}$) has a typical value of 16V, wherein the symbol "V" denotes volt. With the aid of the operations of the virtual battery cell simulation circuit 110, the battery cell control chip 120 may control operations of the set of battery cells {B1, B2, B3, B4} according to the virtual total output voltage level ($(5/4) V_{BAT}$). Specifically, in a case where the first input terminal (which is the negative input terminal and labeled "−" in this embodiment) is coupled to the total output voltage level $V_{BAT}$, the virtual battery cell simulation circuit 110 may convert the total output voltage level $V_{BAT}$ into the virtual total output voltage level ($(5/4) V_{BAT}$) with the aid of the operation of the OP-AMP 112, and use the output terminal of the OP-AMP 112 to output the virtual total output voltage level ($(5/4) V_{BAT}$). The resistors $R_R$ and $R_{4R}$ are used to determine a ratio of the virtual total output voltage level ($(5/4) V_{BAT}$) to the total output voltage level $V_{BAT}$ in order to simulate a voltage across the virtual battery cell $B_{VIR}$, wherein the simulated voltage across the virtual battery cell $B_{VIR}$ approaches an average value of voltages across individual battery cells in the set of battery cells {B1, B2, B3, B4}. For example, in a case where the first input terminal of the OP-AMP 112 receives the total output voltage level $V_{BAT}$ of 12.8V, a voltage level at the second input terminal of the OP-AMP 112 is 12.8V. The virtual total output voltage level ($(5/4) V_{BAT}$) may be calculated as follows: $(5/4) V_{BAT}$=(a voltage level at the first input terminal)$\times(1+R_R/R_{4R})$ =12.8V$\times$(1+499KΩ/2000KΩ)=16V. Hence, a voltage level at the control terminal VB5 may be 16V.

Please note that the at least one virtual battery cell is the single virtual battery cell $B_{VIR}$ in this embodiment. This is for illustrative purposes only, and is not meant to be a limitation of the present invention. According to variations of this embodiment, a ratio of the resistance value of the resistor $R_R$ to the resistance value of the resistor $R_{4R}$ may be varied, and the virtual total output voltage level may be varied accordingly in order to simulate an output voltage level of connecting the set of battery cells {B1, B2, B3, B4} and a plurality of virtual battery cells in series. For example, in a case where the virtual total output voltage level is replaced by another virtual total output voltage level ($(6/4) V_{BAT}$), the another virtual total output voltage level ($(6/4) V_{BAT}$) may simulate an output voltage level of connecting the set of battery cells {B1, B2, B3, B4} and two virtual battery cells (e.g. two series-connected virtual battery cells {$B_{VIR}$}) in series. In another example, in a case where the virtual total output voltage level is replaced by another virtual total output voltage level ($(7/4) V_{BAT}$), the another virtual total output voltage level ($(7/4) V_{BAT}$) may simulate an output voltage level of connecting the set of battery cells {B1, B2, B3, B4} and three virtual battery cells (e.g. three series-connected virtual battery cells {$B_{VIR}$}) in series. Other output voltage levels may be simulated in a similar manner.

Figure 3:
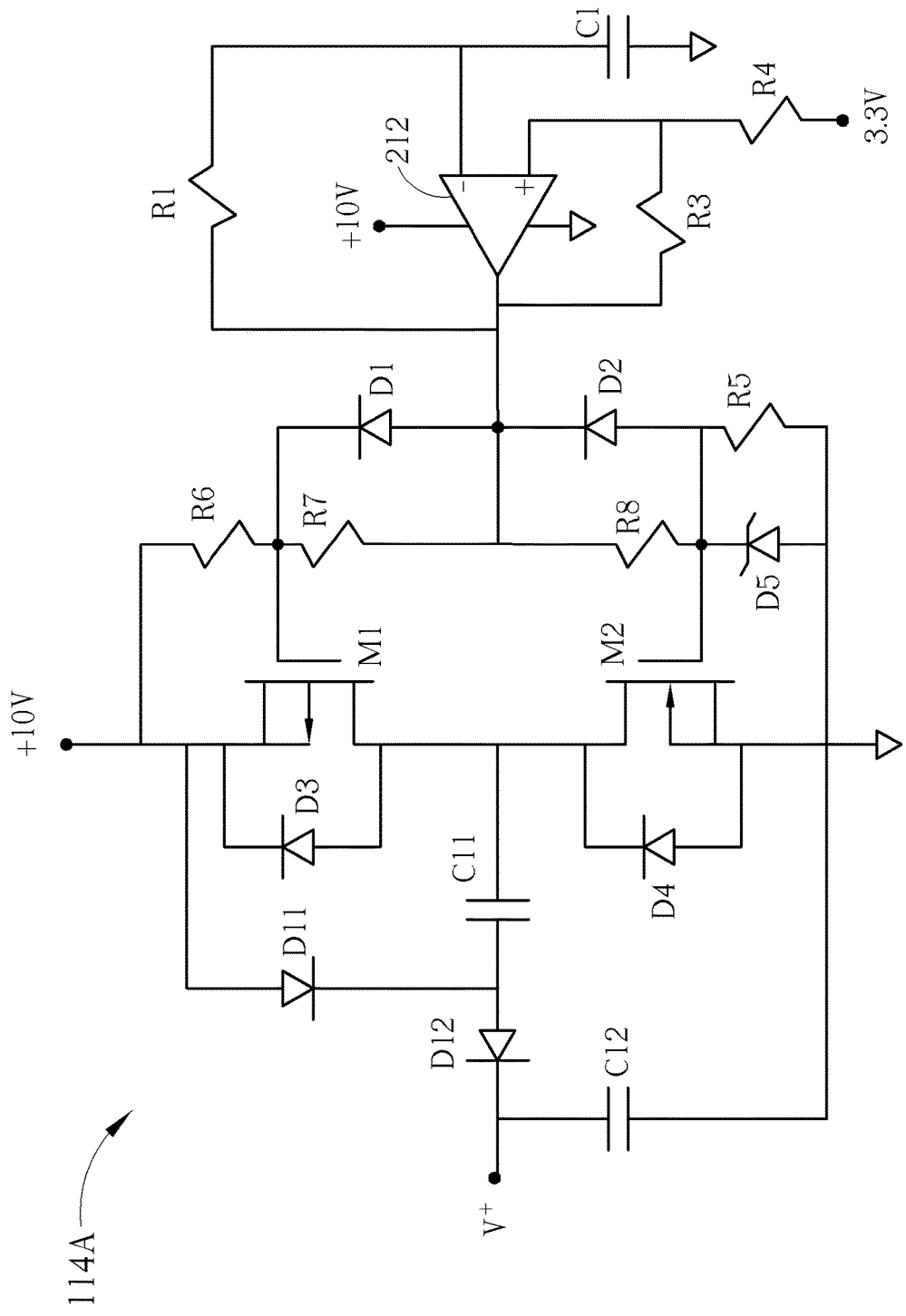
FIG. 3 is a diagram illustrating details of an embodiment of the method shown in FIG. 2.
Figure 4:
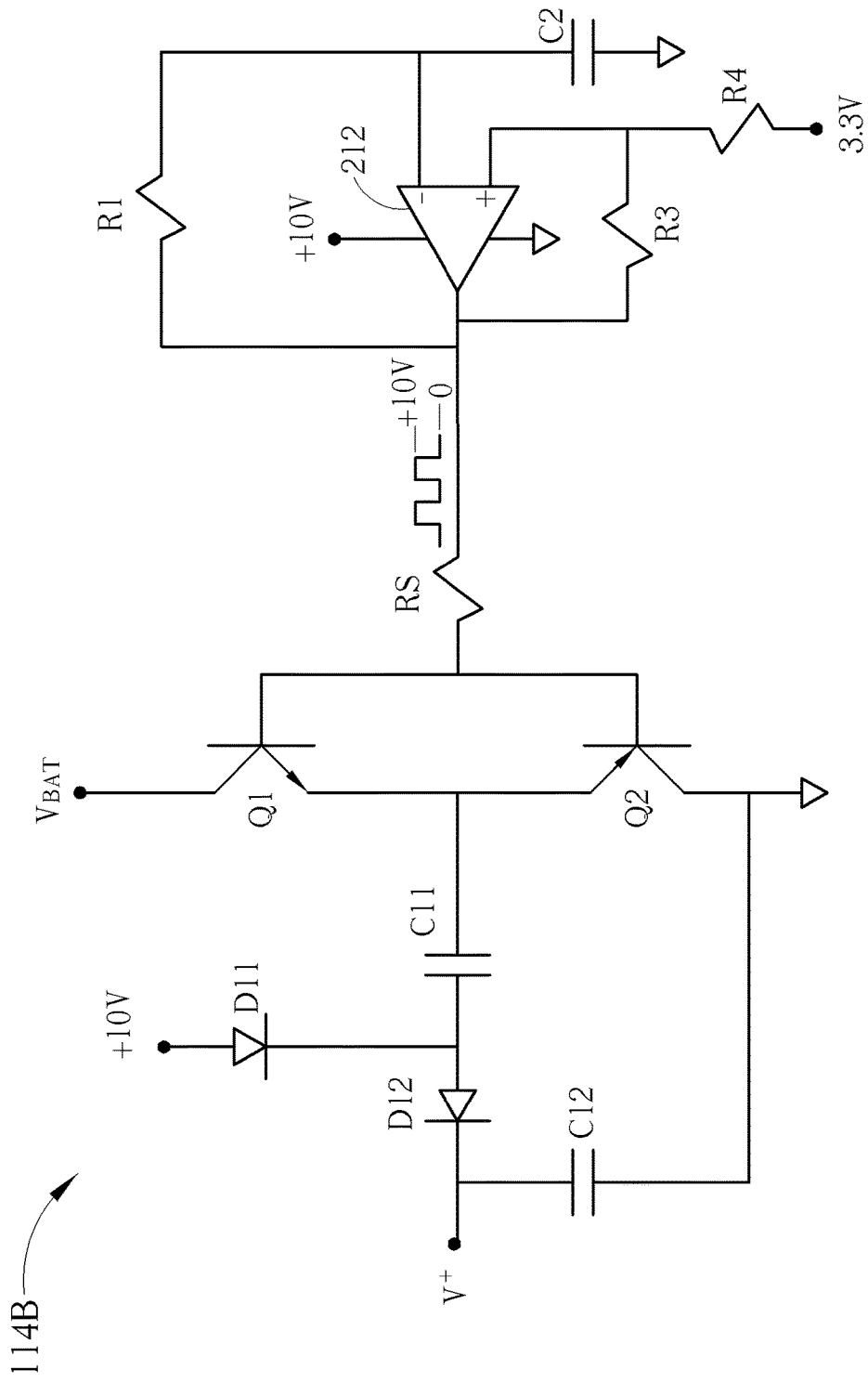
FIG. 4 is a diagram illustrating details of another embodiment of the method shown in FIG. 2.
Figure 5:
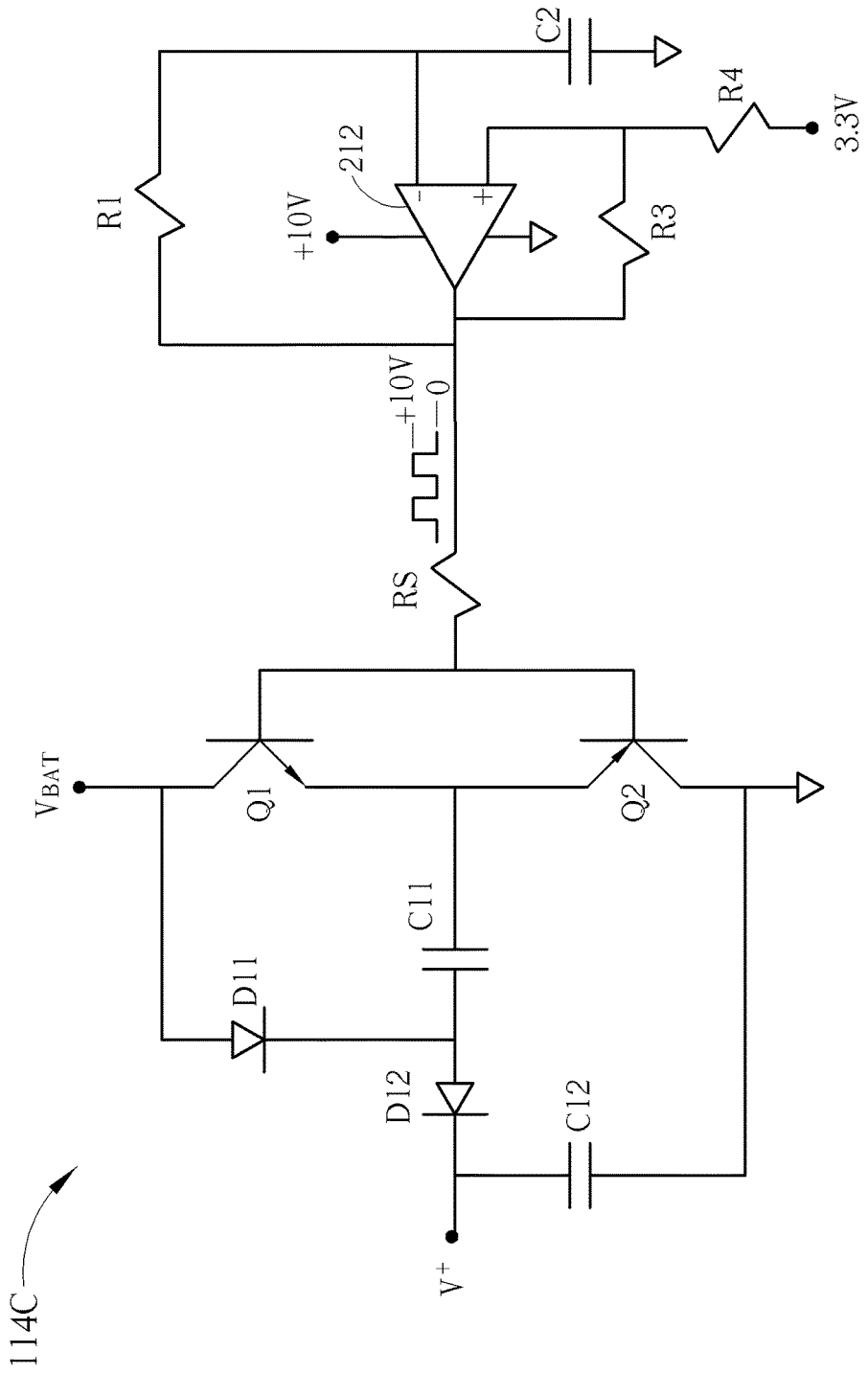
FIG. 5 is a diagram illustrating details of another embodiment of the method shown in FIG. 2.

In a case where the power supply device lacks an external power source, the supply voltage generator 114 may provide a steady supply voltage (e.g. a supply voltage V$^+$) to the OP-AMP 112 in order to maintain the operations of the virtual battery cell simulation circuit 110, wherein the supply voltage generator 114 will not affect (and is not affected by) an operation of the battery cell control chip 120. The supply voltage V$^+$ generated by the supply voltage generator 114 may be referred to as a bias voltage, and may be greater than the virtual total output voltage level ($(5/4) V_{BAT}$). Some embodiments of the supply voltage generator 114 are shown in FIGS. 3-5. In this embodiment, by way of example, the operation of the battery cell control chip 120 may be balance control of the set of battery cells {B1, B2, B3, B4}, wherein voltages across the battery cells B1, B2, B3 and B4 will approach an identical voltage due to the balance control. Please note that, in a case where the power supply device lacks an external power source, the supply voltage generator 114 may use the set of battery cells {B1, B2, B3, B4} as a power source, which may be further converted into voltage (s) required by certain internal elements within the supply voltage generator 114. Hence, in order to achieve objectives "maintaining the operations of the virtual battery cell simulation circuit 110", "preventing the virtual battery cell simulation circuit 110 from being affected by the battery cell control chip 120" and "preventing the virtual battery cell simulation circuit 110 from affecting the battery cell control chip 120", the architecture of the supply voltage generator 114 and the corresponding operating method are properly designed. Further description is provided below.

Figure 2:
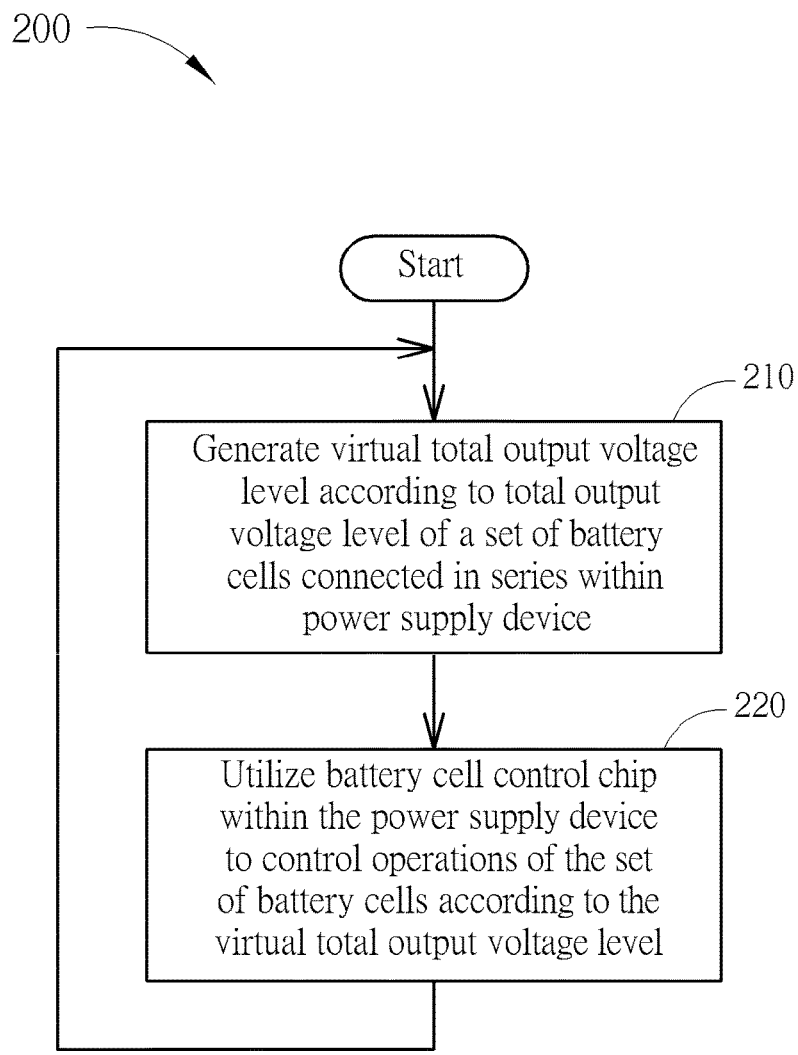
FIG. 2 is a flowchart illustrating an exemplary method for performing battery cell control with aid of virtual battery mechanism according to an embodiment of the present invention.

FIG. 2 is a flowchart illustrating an exemplary method 200 for performing battery cell control with aid of virtual battery mechanism according to an embodiment of the present invention. The method may be applied to the apparatus 100 shown in FIG. 1, especially the virtual battery cell simulation circuit 110 shown in FIG. 1. The method is described below.

In step 210, the virtual battery cell simulation circuit 110 may generate the virtual total output voltage level ($(5/4) V_{BAT}$) according to the total output voltage level $V_{BAT}$ of the set of battery cells {B1, B2, B3, B4} connected in series within the power supply device, wherein the virtual total output voltage level ($(5/4) V_{BAT}$) simulates an output voltage level of connecting the set of battery cells {B1, B2, B3, B4} and at least one virtual battery cell in series, and the at least one virtual battery cell may be the single virtual battery cell $B_{VIR}$. More specifically, the virtual battery cell simulation circuit 110 may dynamically adjust the virtual total output voltage level ($(5/4) V_{BAT}$) to maintain the normal and precise operations of the battery cell control chip 120. For example, the virtual battery cell simulation circuit 110 may dynamically adjust the virtual total output voltage level ((5/4) $V_{BAT}$) to maintain a ratio of the virtual total output voltage level ((5/4) $V_{BAT}$) to the total output voltage level $V_{BAT}$ in order to simulate a voltage across the virtual battery cell $B_{VIR}$, wherein the simulated voltage across the virtual battery cell $B_{VIR}$ approaches an average value of voltages across individual battery cells in the set of battery cells. {B1, B2, B3, B4}. Please note that the at least one virtual is the single virtual battery cell $B_{VIR}$ in this embodiment. This is for illustrative purposes only, and is not meant to be a limitation of the present invention. According to variations of this embodiment, a ratio of the resistance value of the resistor $R_R$ to the resistance value of the resistor $R_{4R}$ may be varied, and the virtual total output voltage level may be varied accordingly in order to simulate an output voltage level of connecting the set of battery cells {B1, B2, B3, B4} and a plurality of virtual battery cells in series.

In step 220, the battery cell control chip 120 may control the operations of the set of battery cells {B1, B2, B3, B4} according to the virtual total output voltage level ((5/4) $V_{BAT}$). For example, the battery cell control chip 120 may control an balance operation of the set of battery cells {B1, B2, B3, B4}, especially the aforementioned balance control of the set of battery cells {B1, B2, B3, B4}, wherein voltages across the battery cells B1, B2, B3 and B4 will approach an identical voltage due to the balance control. The battery cell control chip 120 may be cheated by the virtual total output voltage level ((5/4) $V_{BAT}$) so that the battery cell control chip 120 performs the balance control as if the balance control was performed upon the battery cells B1, B2, B3 and B4 and the virtual battery cell $B_{VIR}$. In another example, the battery cell control chip 120 may control the charging of the set of battery cells {B1, B2, B3, B4}. In still another example, the battery cell control chip 120 may control the discharging of the set of battery cells {B1, B2, B3, B4}.

Please note that, in step 220, no matter which type of control operation the battery cell control chip 120 performs upon the set of battery cells {B1, B2, B3, B4}, the control terminal VB5 needs to receive an appropriate signal (e.g. the virtual total output voltage level ((5/4) $V_{BAT}$) for dynamic adjustment) in order to maintain the normal and precise operations of the battery cell control chip 120. In view of the above, the battery cell control chip 120 does control the operations of the set of battery cells {B1, B2, B3, B4} by dynamically adjusting the virtual total output voltage level ((5/4) $V_{BAT}$).

Additionally, the flowchart shown in FIG. 2 includes a loop consisting of step 210 and step 220. This is for illustrative purposes only, and is not meant to be a limitation of the present invention. According to variations of this embodiment, at least a portion (a portion or all) of the operation of step 210 and at least a portion (a portion or all) of the operation of step 220 may proceed simultaneously. According to variations of this embodiment, after completion of step 220, the flow needs not enter step 210 again. Processes in the variations may further include other operations.

In this embodiment, the apparatus 100 may output the virtual total output voltage level ((5/4) $V_{BAT}$) to one of a plurality of battery control terminals (e.g. the control terminal VB5) of the battery cell control chip 120. Additionally, the method may include the step of electrically connecting a terminal of each battery cell in the set of battery cells {B1, B2, B3, B4} to at least a portion of others of the battery control terminals (e.g. the control terminals VB0, VB1, VB2, VB3 and VB4) in advance. This is for illustrative purposes only, and is not meant to be a limitation of the present invention. According to variations of this embodiment, the virtual total output voltage level is not limited to ((5/4) $V_{BAT}$). Specifically, the at least one virtual battery cell may include a plurality of virtual battery cells, which means that the number of the virtual total output voltage level is not limited to one. In at least a portion of the variations, the virtual battery cell simulation circuit 110 may be extended to a plurality of virtual battery cell simulation circuits such as a plurality of versions of the virtual battery cell simulation circuit 110, wherein a ratio between resistance values of resistors used for voltage division (e.g. the resistors {$R_R$, $R_{4R}$}) in each battery cell simulation circuit may be varied. For example, in a case where the battery cell B4 is removed and the third resistor (e.g. the resistor $R_{0.8R}$) is electrically connected to the control terminal VB3, the virtual battery cell simulation circuits may generates required signals (e.g. virtual total output voltage levels ((5/3) $V_{BAT}$) and ((4/3) $V_{BAT}$)), respectively, which may be inputted to more than one of the battery control terminals of the battery cell control chip 120 (e.g. the control terminals VB5 and VB4). In this example, the method may include the step of electrically connecting a terminal of each battery cell in a new set of battery cells {B1, B2, B3, B4} to at least a portion of others of the battery control terminals (e.g. the control terminals VB0, VB1, VB2 and VB3) in advance.

According to variations of this embodiment, the apparatus 100 may further include another battery control chip, which is used to control operations of another set of battery cells connected in series within the power supply device according to an output voltage level of a specific battery cell in the set of battery cells {B1, B2, B3, B4}. In at least a portion of the variations, a predetermined number of battery cells supported by the another battery cell control chip is greater than a number of battery cells of the another set of battery cells. In another example, the method may include the step of connecting the set of battery cells {B1, B2, B3, B4} in series with the another set of battery cells in advance. Specifically, the method may include the step of selecting a battery cell in the set of battery cells {B1, B2, B3, B4} as the specific battery cell, wherein the battery cell is directly connected in series with the another set of battery cells. Hence, the specific battery cell is directly connected in series with the another set of battery cells.

FIG. 3 is a diagram illustrating details of an embodiment of the method 200 shown in FIG. 2, wherein a supply voltage generator 114A shown in FIG. 3 may be an implementation of the supply voltage generator 114 shown in FIG. 1. The supply voltage generator 114A may generate the supply voltage $V^+$ which is greater than the virtual total output voltage level ((5/4) $V_{BAT}$). For example, the virtual total output voltage level ((5/4) $V_{BAT}$) may be 16V in this embodiment, and the supply voltage $V^+$ generated by the supply voltage generator 114A may be 20V which is greater than the virtual total output voltage level ((5/4) $V_{BAT}$). The supply voltage generator 114A may include an OP-AMP 212, a plurality of capacitors {C1, C11, C12}, a plurality of diodes {D1, D2, D3, D4, D5, D11, D12}, a plurality of resistors {R1, R3, R4, R5, R6, R7, R8}, and a plurality of metal-oxide-semiconductor field-effect transistors (MOSFETs) {M1, M2}, wherein the diode D5 may be a Zener diode. The OP-AMP 212, the capacitor C1, the diodes {D1, D2, D5} and the resistors {R1, R3, R4, R5, R6, R7, R8} may form a control circuit to turn on or turn off the MOSFETs {M1, M2}. In some embodiments, when the control circuit turns off the MOSFET M1 and turns on the MOSFET M2, a voltage source of +10V may cause a current flowing through the diode D11, the capacitor C11 and the MOSFET M2, which develops a voltage of 10V across the capacitor C11. Next, when the control circuit turns on the MOSFET M1 and turns off the MOSFET M2, the voltage source of +10V may generate a current flowing through the MOSFET M1, the capacitor C11 and the diode D12, which increases a voltage level at a terminal of the capacitor C11 coupled to the MOSFET M1 from 0V to 10V. Hence, the voltage across the capacitor C11 may increase to 20V (10V+10V), and the supply voltage generator 114A may generate the supply voltage $V^+$ of +20V.

In practice, the OP-AMP 212 may be implemented by a LP324™ micropower quad operational amplifier manufactured by Texas Instruments (TI), wherein the LP324™ micropower quad operational amplifier includes four available operational amplifiers, has a low typical value for offset voltage, requires a low typical value for supply current, and supports a wide range of supply voltage (from 3V to 32V). In addition, capacitance values of the capacitors {C1, C11, C12} may be {120μ, 0.47μ, 0.47μ} farads, respectively, and resistance values of the resistors {R1, R3, R4, R5, R6, R7, R8} may be {499K, 1M, 1M, 1M, 1M, 10K, 10K} ohms, respectively, wherein the symbols "p" and "μ" denote $10^{-12}$ and $10^{-6}$, respectively.

In view of the above, in a case where the power supply lacks an external power source, the supply voltage generator 114A may use the set of battery cells {B1, B2, B3, B4} as a power source, wherein the supply voltage generator 114A may further include a buck circuit (e.g. a voltage regulator) (not shown in FIG. 3) and use the buck circuit to convert the total output voltage level $V_{BAT}$ into a supply voltage (e.g. +10V) required by a portion of internal elements within the supply voltage generator 114A. In this embodiment, a typical value for the supply voltage $V^+$ outputted from the supply voltage generator 114A is +20V (i.e. 10V+10V).

FIG. 4 is a diagram illustrating details of another embodiment of the method 200 shown in FIG. 2, wherein a supply voltage generator 114B shown in FIG. 4 may be an implementation of the supply voltage generator 114 shown in FIG. 1, and a modification of the supply voltage generator 114A shown in FIG. 3. The supply voltage generator 114B may generate the supply voltage $V^+$ which is greater than the virtual total output voltage level ((5/4) $V_{BAT}$). For example, the virtual total output voltage level ((5/4) $V_{BAT}$) may be 16V in this embodiment, and the supply voltage $V^+$ generated by the supply voltage generator 114B may be ($V_{BAT}$+10V), which is equal to 22.8V (12.8V+10V) and is greater than the virtual total output voltage level ((5/4) $V_{BAT}$). The supply voltage generator 114B may include the OP-AMP 212, a plurality of capacitors {C2, C11, C12}, a plurality of diodes {D11, D12}, a plurality of resistors {R1, R3, R4, R5}, and a plurality of bipolar junction transistors (BJTs) {Q1, Q2}. This is for illustrative purposes only, and is not meant to be a limitation of the present invention. The OP-AMP 212, the capacitor C2 and the resistors {R1, R3, R4, R5} may form a control circuit to turn on or turn off the BJTs {Q1, Q2}. In some embodiments, when the control circuit turns off the BJT Q1 and turns on the BJT Q2, a voltage source of +10V may cause a current flowing through the diode D11, the capacitor C11 and the BJT Q2, which develops a voltage of 10V across the capacitor C11. Next, when the control circuit turns on the BJT Q1 and turns off the BJT Q2, the total output voltage level $V_{BAT}$ may result in a current flowing through the BJT Q1, the capacitor C11 and the diode D12, which increases a voltage level at a terminal of the capacitor C11 coupled to the BJT Q1 from 0V to $V_{BAT}$. Hence, the voltage across the capacitor C11 may increase to $V_{BAT}$+10V, and the supply voltage generator 114B may generate the supply voltage $V^+$ of $V_{BAT}$+10V.

According to a variation of this embodiment, the resistor RS may be neglected/omitted, and the output terminal of the OP-AMP 212 is electrically connected to individual bases of the BJTs {Q1, Q2}. According to another variation of this embodiment, a resistance value of the resistor RS may approach zero but does not reach zero. Please note that, in contrast to the supply voltage generator 114A shown in FIG. 3, this embodiment and variations thereof employ the BJTs {Q1, Q2} to avoid problems caused by the characteristics of the MOSFETs {M1, M2}.

In view of the above, in a case where the power supply lacks an external power source, the supply voltage generator 114B may use the set of battery cells {B1, B2, B3, B4} as a power source, wherein the supply voltage generator 114B may further include the aforementioned buck circuit (not shown in FIG. 4) and use the buck circuit to convert the total output voltage level $V_{BAT}$ into a supply voltage (e.g. +10V) required by a portion of internal elements within the supply voltage generator 114B. In this embodiment, a typical value for the supply voltage $V^+$ outputted from the supply voltage generator 114B is $V_{BAT}$+10V.

FIG. 5 is a diagram illustrating details of another embodiment of the method 200 shown in FIG. 2, wherein a supply voltage generator 114C shown in FIG. 5 may be an implementation of the supply voltage generator 114 shown in FIG. 1, and a modification of the supply voltage generator 114B shown in FIG. 4. Please note that the main difference between the supply voltage generator 114C shown in FIG. 5 and the supply voltage generator 114B shown in FIG. 4 is that a top terminal of the diode D11 is electrically connected to the total output voltage level $V_{BAT}$. The supply voltage generator 114C may generate the supply voltage $V^+$ which is greater than the virtual total output voltage level ((5/4) $V_{BAT}$). For example, the virtual total output voltage level ((5/4) $V_{BAT}$) may be 16V in this embodiment, and the supply voltage $V^+$ generated by the supply voltage generator 114C may be $2 \times V_{BAT}$, which is equal to 25.6V (2×12.8V) and is greater than the virtual total output voltage level ((5/4) $V_{BAT}$).

As similar to the embodiment shown in FIG. 4, the OP-AMP 212, the capacitor C2 and the resistors {R1, R3, R4, R5} may form a control circuit to turn on or turn off the BJTs {Q1, Q2}. In some embodiments, when the control circuit turns off the BJT Q1 and turns on the BJT Q2, the total output voltage level $V_{BAT}$ may result in a current flowing through the diode D11, the capacitor C11 and the BJT Q2, which develops a voltage of $V_{BAT}$ across the capacitor C11. Next, when the control circuit turns on the BJT Q1 and turns off the BJT Q2, the total output voltage level $V_{BAT}$ may result in a current flowing through the BJT Q1, the capacitor C11 and the diode D12, which increases a voltage level at a terminal of the capacitor C11 coupled to the BJT Q1 from 0V to $V_{BAT}$. Hence, the voltage across the capacitor C11 may increase to $V_{BAT}$+$V_{BAT}$, and the supply voltage generator 114C may generate the supply voltage $V^+$ of $2 \times V_{BAT}$.

In brief, each of the aforementioned supply voltage generators 114A-114C may generate a supply voltage $V^+$ greater than the virtual total output voltage level ((5/4) $V_{BAT}$), wherein the generated voltage levels $V^+$ may be +20V, $V_{BAT}$+10V or $2 \times V_{BAT}$. However, this is for illustrative purposes only and is not meant to be a limitation of the present invention. For example, the generated voltage levels $V^+$ may be adjusted according to the specifications and/or the number of battery cells. As long as the generated voltage levels V$^+$ is greater than the virtual total output voltage level ((5/4) V$_{BAT}$), various alternatives and modifications fall within the scope of the present invention.

In view of the above, in a case where the power supply lacks an external power source, the supply voltage generator 114C may use the set of battery cells {B1, B2, B3, B4} as a power source, wherein the supply voltage generator 114C may further include the aforementioned buck circuit (not shown in FIG. 5) and use the buck circuit to convert the total output voltage level V$_{BAT}$ into a supply voltage (e.g. +10V) required by a portion of internal elements within the supply voltage generator 114C. In this embodiment, a typical value for the supply voltage V$^+$ outputted from the supply voltage generator 114C is about (2×V$_{BAT}$).

Figure 6:
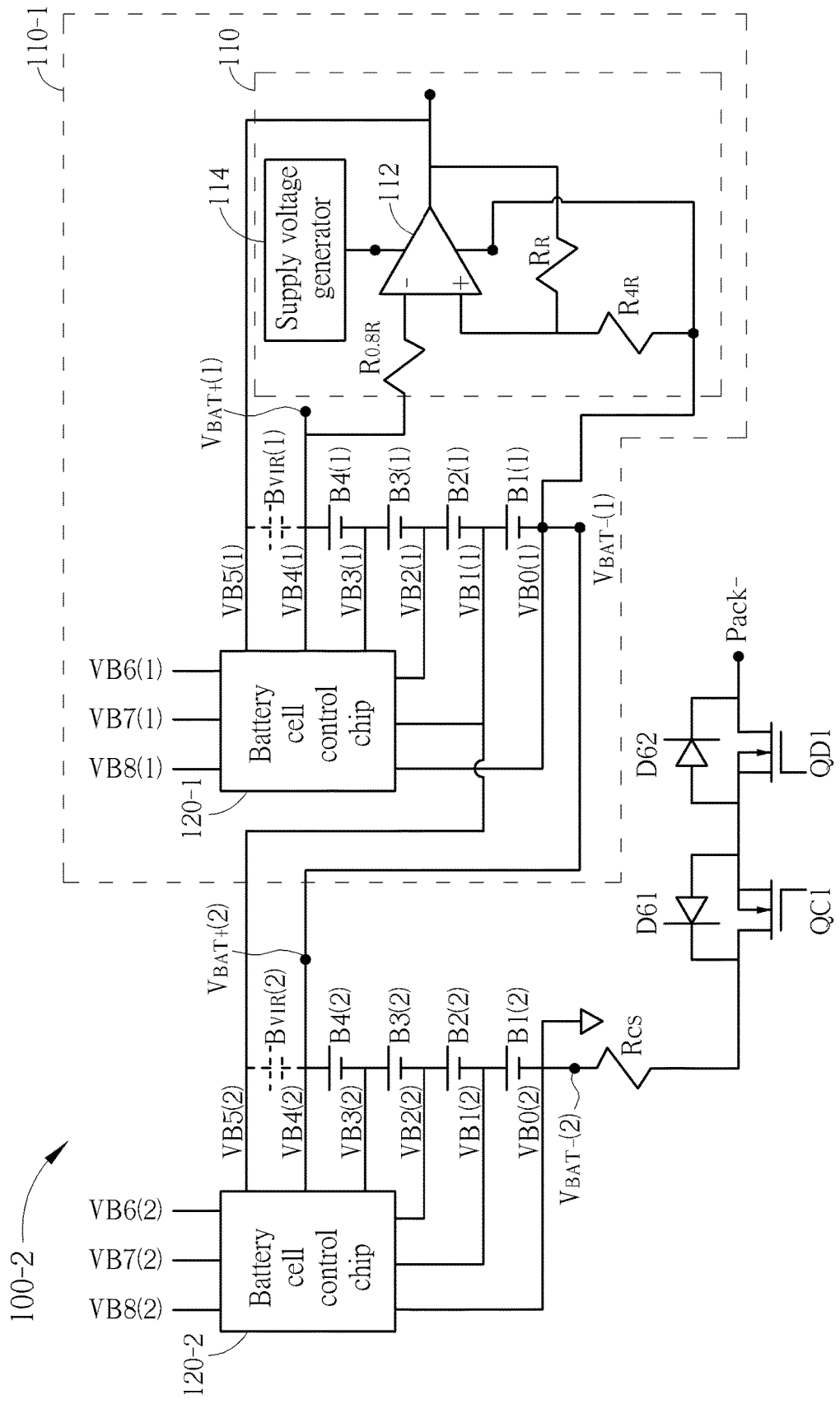
FIG. 6 is a diagram illustrating an exemplary apparatus for performing battery cell control with aid of virtual battery mechanism according to a second embodiment of the present invention.

FIG. 6 is a diagram illustrating an exemplary apparatus 100-2 for performing battery cell control with aid of virtual battery mechanism according to a second embodiment of the present invention. Each of a set of battery cells {B1(1), B2(1), B3(1), B4(1)} and a set of battery cells {B1(2), B2(2), B3(2), B4(2)} is a replica of the set of battery cells {B1, B2, B3, B4}, and each of a battery cell control chip 120-1 and a battery cell control chip 120-2 is a replica of the battery cell control chip 120. To facilitate understanding of technical features of the present invention, FIG. 6 illustrates virtual battery cells B$_{VTR}$(1) and B$_{VTR}$(2) (which correspond to the set of battery cells {B1(1), B2(1), B3(1), B4(1)} and the set of battery cells {B1(2), B2(2), B3(2), B4(2)}, respectively) and control terminals {VB0(1), VB1(1), VB2(1), VB3(1), VB4(1), VB5(1), VB6(1), VB7(1), VB8(1)} and {VB0(2), VB1(2), VB2(2), VB3(2), VB4(2), VB5(2), VB6(2), VB7(2), VB8(2)} (which correspond to the battery cell control chip 120-1 and the battery cell control chip 120-2, respectively). Additionally, FIG. 6 also illustrates external terminals {V$_{BAT+}$(1), V$_{BAT-}$(1)} and {V$_{BAT+}$(2), V$_{BAT-}$(2)} corresponding to individual sets of battery cells.

In this embodiment, the apparatus 100-2 includes a resistor R$_{CS}$ and a control module, wherein the control module includes a plurality of MOSFETs {QC1, QD1} and a plurality of diodes {D61, D62}. In practice, different implementation options of the diodes {D61, D62} are available. For example, the diodes {D61, D62} may be implemented by anti-parallel diodes inside the MOSFETs {QC1, QD1}, respectively. In another example, the diodes {D61, D62} may be implemented by diodes placed outside the MOSFETs {QC1, QD1}, respectively. In addition, the apparatus 100-2 may perform current sensing by detecting a voltage difference between two terminals of the resistor R$_{CS}$. Specifically, the apparatus 100-2 may obtain a sensed current value by dividing the voltage difference by the resistance value of the resistor R$_{CS}$. The apparatus 100-2 may utilize the MOSFETs {QC1, QD1} and the diodes {D61, D62} to control the charging or discharging of the power supply device, and the charging or discharging may be performed upon terminals Pack– and Pack+ of the power supply device, wherein the external terminal V$_{BAT+}$(1) of the set of battery cells {B1(1), B2(1), B3(1), B4(1)} shown on the right side in FIG. 6 may be used as the terminal Pack+. Please note that the apparatus 100-2 includes the virtual battery cell simulation circuit 110. By employing the architecture shown in FIG. 6, a new virtual battery cell simulation circuit 110-1 is formed on the right side in FIG. 6. The virtual battery cell B$_{VTR}$(2) is connected in parallel with the battery cell B1(1) within the virtual battery cell simulation circuit 110-1, such that a voltage across the virtual battery cell B$_{VTR}$(2) is equal to a voltage across the battery cell B1(1). For example, if a typical value for a voltage difference between external terminals V$_{BAT+}$(1) and V$_{BAT-}$(1) (a total output voltage level) is 12.8V and a typical value for a voltage difference between external terminals V$_{BAT+}$(2) and V$_{BAT-}$(2) (a total output voltage level) is 12.8V, each of the voltage across the battery cell B1(1) and the voltage across the virtual battery cell B$_{VTR}$(2) is 3.2V, and the control terminal VB5(2) of the battery cell control chip 120-2 may receive a voltage of 16V. Hence, there is no need to provide an extra virtual battery cell simulation circuit (e.g. a replica of the virtual battery cell simulation circuit 110) for the virtual battery cell B$_{VTR}$(2) connected to the battery cell control chip 120-2. In this embodiment, in order to avoid erroneous operations of the power supply device, the external terminal V$_{BAT-}$(1) of the set of battery cells {B1(1), B2(1), B3(1), B4(1)} shown on the right side in FIG. 6 cannot be connected to ground.

Figure 7:
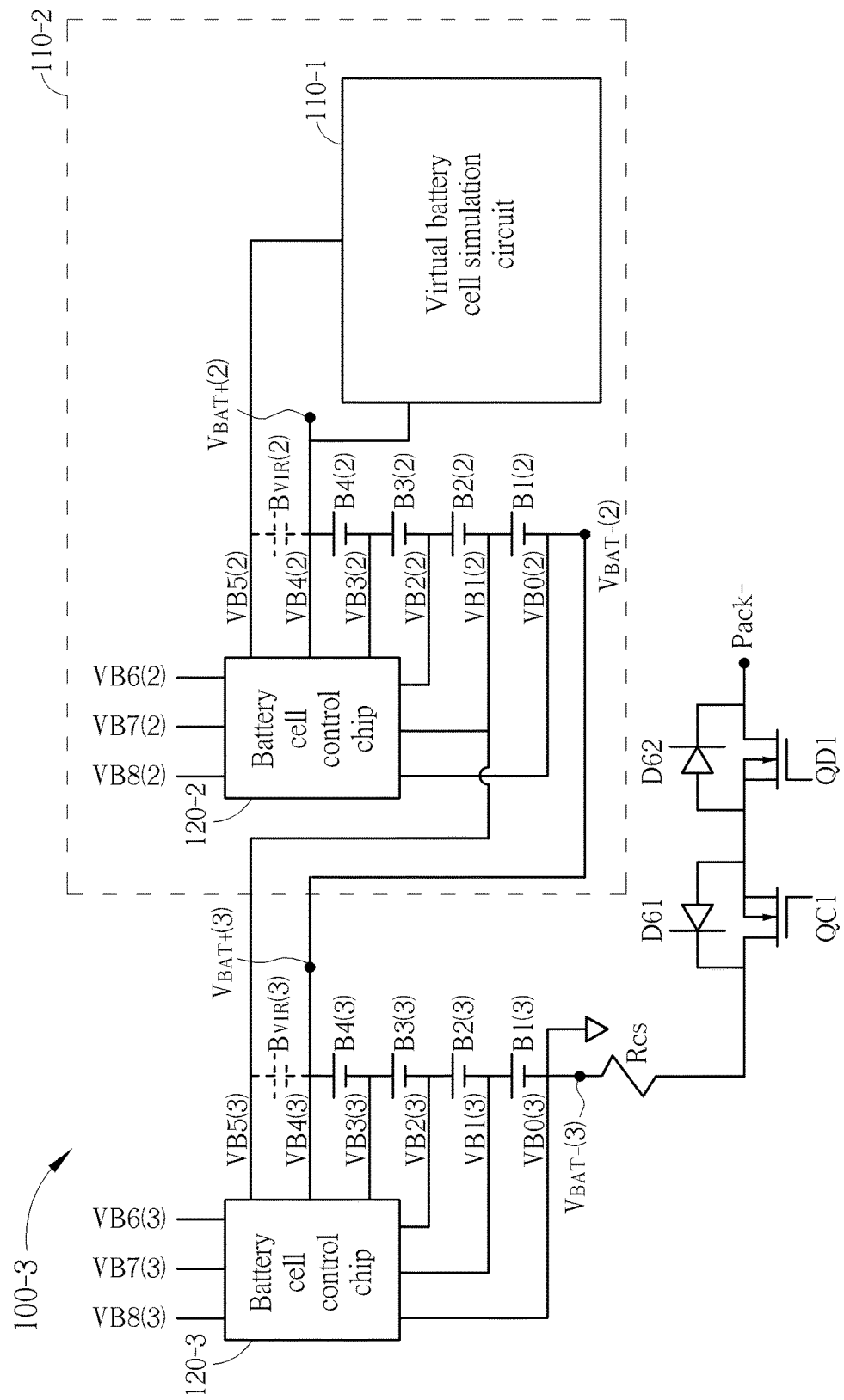
FIG. 7 is a diagram illustrating an exemplary apparatus for performing battery cell control with aid of virtual battery mechanism according to a third embodiment of the present invention.

FIG. 7 is a diagram illustrating an exemplary apparatus 100-3 for performing battery cell control with aid of virtual battery mechanism according to a third embodiment of the present invention. A new set of battery cells {B1(3), B2(3), B3(3), B4(3)} is a replica of the set of battery cells {B1, B2, B3, B4}, and a battery cell control chip 120-3 is a replica of the battery cell control chip 120. To facilitate understanding of technical features of the present invention, FIG. 7 illustrates virtual battery cells B$_{VTR}$(2) and B$_{VTR}$(3) (which correspond to the set of battery cells {B1(2), B2(2), B3(2), B4(2)} and the set of battery cells {B1(3), B2(3), B3(3), B4(3)}, respectively) and control terminals {VB0(2), VB1(2), VB2(2), VB3(2), VB4(2), VB5(2), VB6(2), VB7(2), VB8(2)} and {VB0(3), VB1(3), VB2(3), VB3(3), VB4(3), VB5(3), VB6(3), VB7(3), VB8(3)} (which correspond to the battery cell control chip 120-2 and the battery cell control chip 120-3, respectively). Additionally, FIG. 7 also illustrates external terminals {V$_{BAT+}$(2), V$_{BAT-}$(2)} and {V$_{BAT+}$(3), V$_{BAT-}$(3)} which corresponds to the set of battery cells {B1(2), B2(2), B3(2), B4(2)} and the set of battery cells {B1(3), B2(3), B3(3), B4(3)}, respectively.

As shown in FIG. 7, the new set of battery cells {B1(3), B2(3), B3(3), B4(3)} is connected in series with the set of battery cells {B1(2), B2(2), B3(2), B4(2)}, and the top terminal of the resistor R$_{CS}$ shown in FIG. 6 is electrically connected to the bottom of the new set of battery cells {B1(3), B2(3), B3(3), B4(3)}. Please note that the apparatus 100-3 includes all elements of the apparatus 100-2, and thus includes the virtual battery cell simulation circuit 110-1, wherein the virtual battery cell simulation circuit 110-1 includes the virtual battery cell simulation circuit 110. Similarly, by employing the architecture shown in FIG. 7, a new virtual battery cell simulation circuit 110-2 is formed on the right side in FIG. 7. Hence, replicas of the virtual battery cell simulation circuit 110 need not be disposed in the apparatus 100-3.

Figure 8:
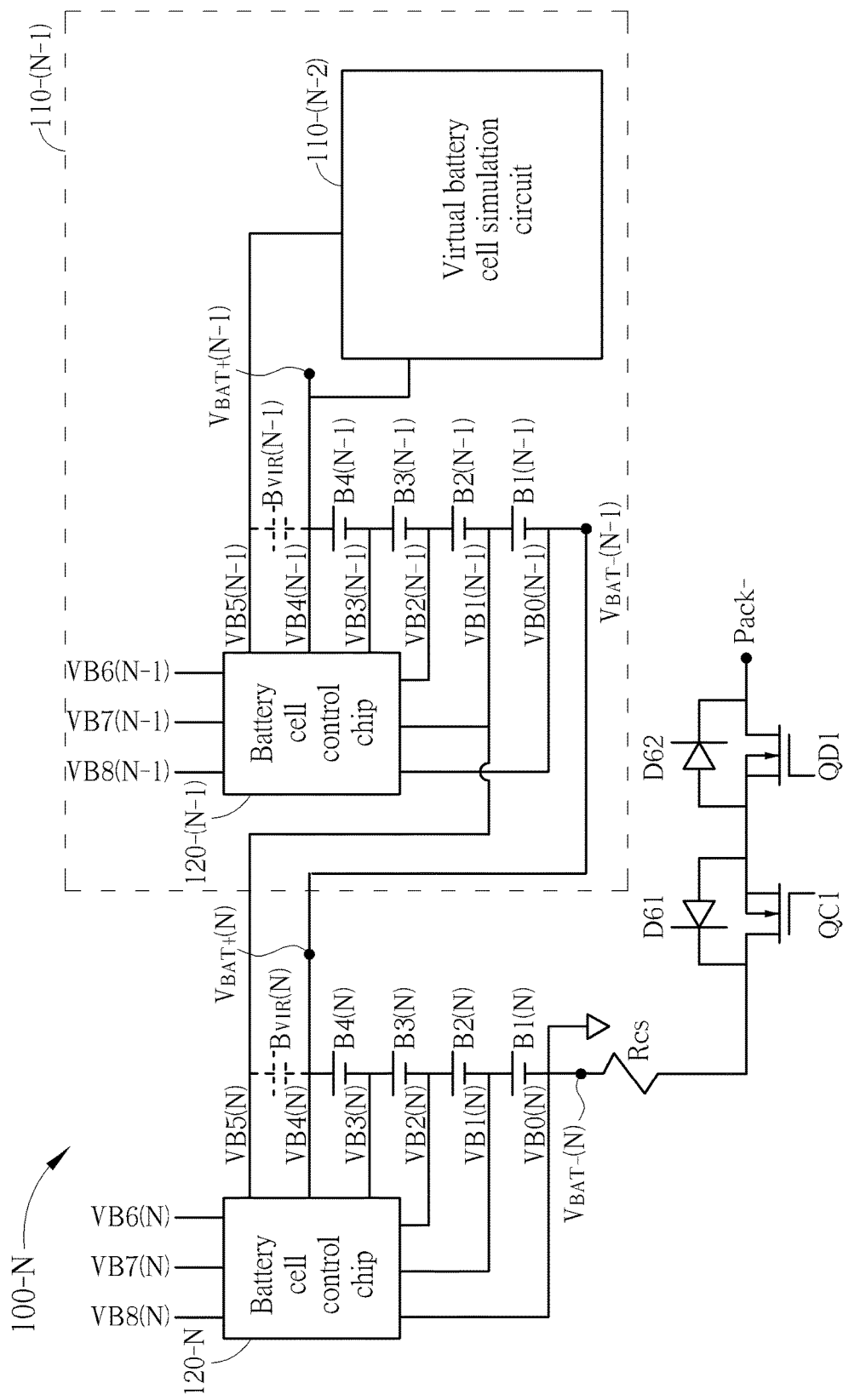
FIG. 8 is a diagram illustrating an exemplary apparatus for performing battery cell control with aid of virtual battery mechanism according to a fourth embodiment of the present invention.

FIG. 8 is a diagram illustrating an exemplary apparatus 100-N for performing battery cell control with aid of virtual battery mechanism according to a fourth embodiment of the present invention. Each of sets of battery cells {B1(1), B2(1), B3(1), B4(1)}, {B1(2), B2(2), B3(2), B4(2)}, {B1(3), B2(3), B3(3), B4(3)} . . . {B1(N−1), B2(N−1), B3(N−1), B4(N−1)} and {B1(N), B2(N), B3(N), B4(N)} is a replica of the set of battery cells {B1, B2, B3, B4}, and each of battery cell control chips 120-1, 120-2, 120-3 . . . 120-(N−1) and 120-N is a replica of the battery cell control chip 120. To facilitate understanding of technical features of the present invention, FIG. 8 illustrates virtual battery cells B$_{VTR}$(N−1) and B$_{VTR}$(N) (which correspond to the set of battery cells {B1(N−1), B2(N−1), B3(N−1), B4(N−1)} and the set of battery cells {B1(N), B2(N), B3(N), B4(N)}, respectively) and control terminals {VB0(N−1), VB1(N−1), VB2(N−1), VB3(N−1), VB4(N−1), VB5(N−1), VB6(N−1), VB7(N−1), VB8(N−1)} and {VB0(N), VB1(N), VB2(N), VB3(N), VB4(N), VB5(N), VB6(N), VB7(N), VB8(N)} (which correspond to the battery cell control chip 120-(N−1) and the battery cell control chip 120-N, respectively). Additionally, FIG. 8 also illustrates external terminals {$V_{BAT+}$(N−1) $V_{BAT-}$(N−1)} and {$V_{BAT+}$(N), $V_{BAT-}$(N)}, which corresponds to the set of battery cells {B1(N−1), B2(N−1), B3(N−1), B4(N−1)} and the set of battery cells {B1(N), B2(N), B3(N), B4(N)}, respectively. In one example, N may equal 4. In another example, N may equal 5 or an integer greater than 5.

As shown in FIG. 8, the new set of battery cells {B1(N), B2(N), B3(N), B4(N)} is connected in series with the set of battery cells {B1(N−1), B2(N−1), B3(N−1), B4(N−1)}, and the top terminal of the resistor $R_{CS}$ shown in FIG. 6 is electrically connected to the bottom of the new set of battery cells {B1(N), B2(N), B3(N), B4(N)}. Please note that the apparatus 100-N includes all elements of the apparatus 100-(N−1), the apparatus 100-(N−1) includes all elements of the apparatus 100-(N−2) and so on. Thus, the apparatus 100-N may include all elements of the apparatus 100-2 and include the virtual battery cell simulation circuit 110-1, wherein the virtual battery cell simulation circuit 110-1 includes the virtual battery cell simulation circuit 110. Similarly, by employing the architecture shown in FIG. 8, a new virtual battery cell simulation circuit 110-(N−1) is formed on the right side in FIG. 8. Hence, replicas of the virtual battery cell simulation circuit 110 need not be disposed in the apparatus 100-N.

Figure 9:
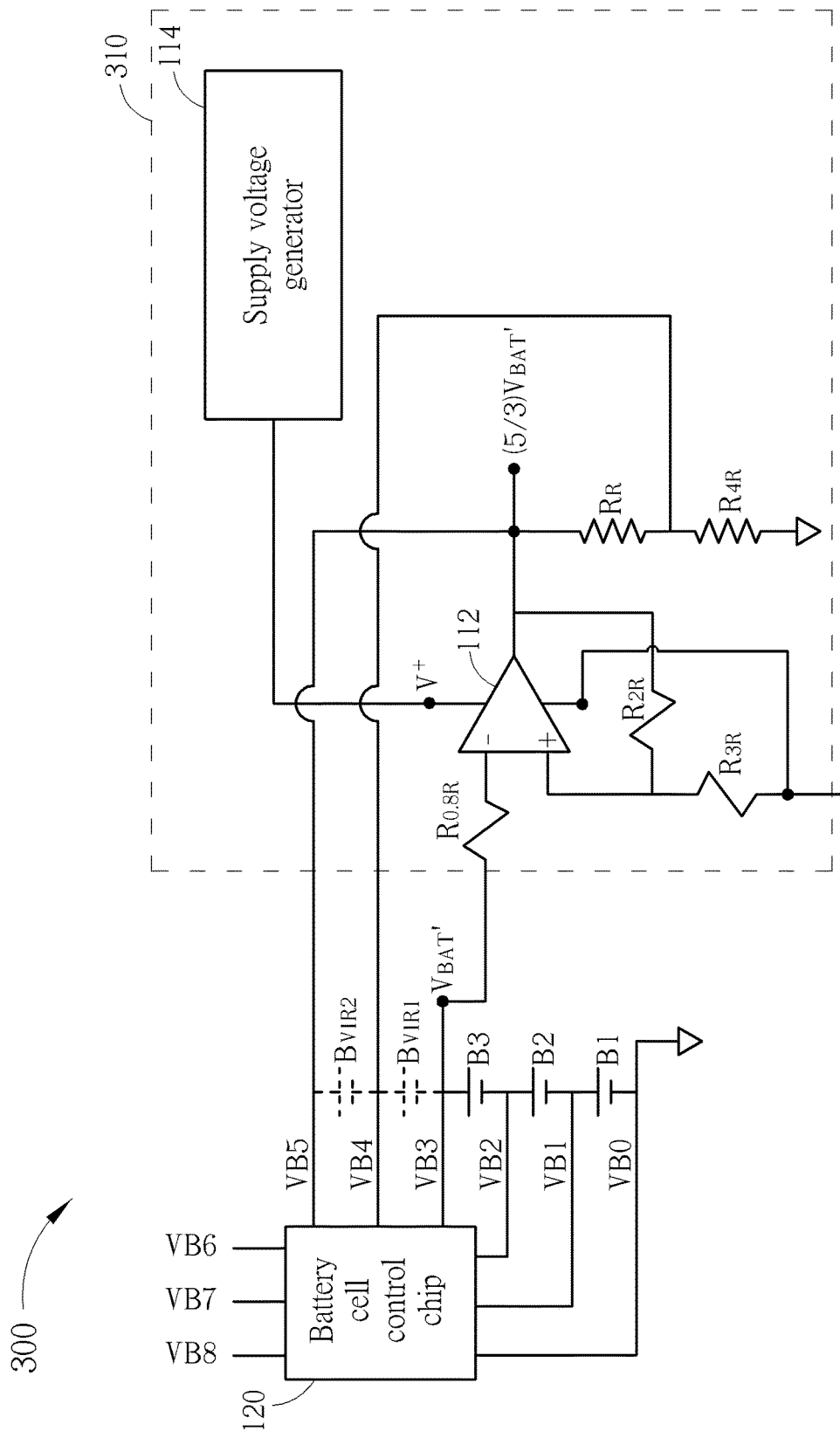
FIG. 9 is a diagram illustrating an exemplary apparatus for performing battery cell control with aid of virtual battery mechanism according to a fifth embodiment of the present invention.

FIG. 9 is a diagram illustrating an exemplary apparatus 300 for performing battery cell control with aid of virtual battery mechanism according to a fifth embodiment of the present invention. This embodiment may simulate a plurality of virtual battery cells such as two virtual battery cells $B_{VIR1}$ and $B_{VIR2}$.

As shown in FIG. 9, the main difference between the fifth embodiment shown in FIG. 9 and the first embodiment shown in FIG. 1 is that the battery cell B4 in the set of battery cells {B1, B2, B3, B4} is removed. The set of battery cells {B1, B2, B3, B4} may be replaced by a new set of battery cells {B1, B2, B3} having a smaller number of battery cells, and a total output voltage level of the new set of battery cells {B1, B2, B3} may be labeled $V_{BAT}'$. In this embodiment, the output terminal of the OP-AMP 112 may output a virtual total output voltage level ((5/3) $V_{BAT}'$). Specifically, the aforementioned first and second resistors may be implemented by resistors $R_{2R}$ and $R_{3R}$, respectively, which may be used to control the magnitude of the virtual total output voltage level ((5/3) $V_{BAT}'$). In addition, the resistors $R_R$ and $R_{4R}$ may be used to implement a voltage divider circuit (instead of the aforementioned first and second resistors) which may generate a divided voltage level ((4/3) $V_{BAT}'$). Please note that the circuit consisting of the resistors $R_R$ and $R_{4R}$ shown in FIG. 9 is merely one example of the voltage divider circuit. This is for illustrative purposes only, and is not meant to be a limitation of the present invention. According to variations of this embodiment, the architecture of voltage divider circuit may be modified/varied.

In this embodiment, the resistors $R_R$, $R_{2R}$, $R_{3R}$, $R_{4R}$ and $R_{0.8R}$ may be R, 2R, 3R, 4R and 0.8R, wherein the resistance value R is a predetermined resistance value. In response to variations of the architecture, the aforementioned virtual battery cell simulation circuit is labeled 310 in this embodiment. For the sake of brevity, similar descriptions are not repeated here.

Figure 10:
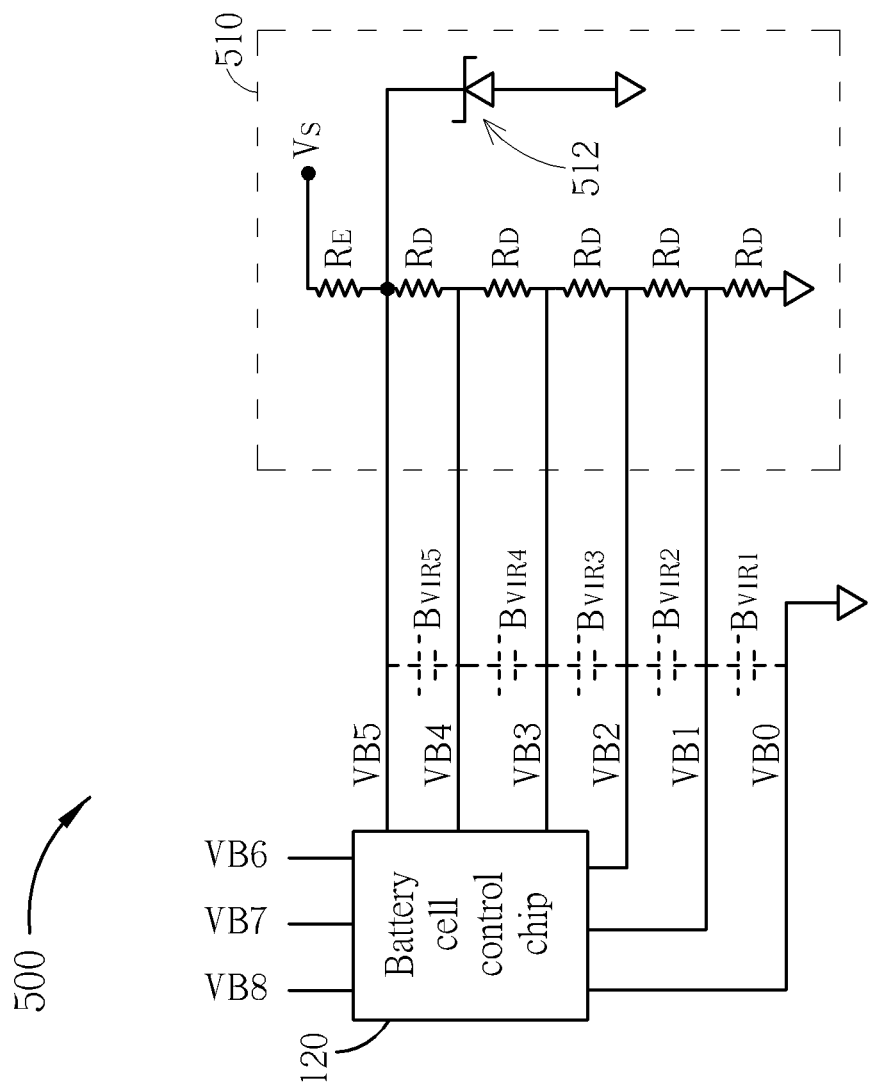
FIG. 10 is a diagram illustrating an exemplary apparatus for performing battery cell control with aid of virtual battery mechanism according to a sixth embodiment of the present invention.

FIG. 10 is a diagram illustrating an exemplary apparatus 500 for performing battery cell control with aid of virtual battery mechanism according to a sixth embodiment of the present invention.

The apparatus 500 may include at least a portion (e.g. a portion or all) of a power supply device. In a case where the set of control terminals {VB0, VB1, VB2, VB3, VB4, VB5, VB6, VB7, VB8} is not electrically connected to any battery cells (e.g. a portion or all of the battery cells in the set of battery cells {B1, B2, B3, B4}), this embodiment may simulate a plurality of virtual battery cells (e.g. five virtual battery cells $B_{VIR1}$, $B_{VIR2}$, $B_{VIR3}$, $B_{VIR4}$ and $B_{VIR5}$).

As shown in FIG. 10, the main difference between the sixth embodiment shown in FIG. 10 and the first embodiment shown in FIG. 1 is that all of the battery cells in the set of battery cells {B1, B2, B3, B4} shown in FIG. 1 are removed, and that the proposed virtual battery cell simulation circuit (labeled 510 in FIG. 10) operates based on a Zener diode 512 and a supply voltage $V_S$ outputted from another supply voltage generator (not shown in FIG. 10), wherein the another supply voltage generator may be an internal power supply within the apparatus 500 or an external power supply. In response to variations of the architecture, the aforementioned virtual battery cell simulation circuit is labeled 510 in this embodiment. The virtual battery cell simulation circuit 510 may utilize the Zener diode 512 to provide a virtual total output voltage level, and further include series-connected resistors {$R_D$} and $R_E$, wherein the resistors {$R_D$} form a voltage divider circuit. For example, in a case where the virtual total output voltage level provided by the Zener diode 512 is 16V, the voltage divider circuit may generate a voltage of 3.2V across each of the virtual battery cells $B_{VIR1}$, $B_{VIR2}$, $B_{VIR3}$, $B_{VIR4}$ and $B_{VIR5}$. In practice, the Zener diode 512 may be selected appropriately in order to utilize breakdown voltage characteristics thereof to maintain a voltage level required by the control terminal VB5.

In this embodiment, the voltage level required by the control terminal VB5 is 16V, and the supply voltage $V_S$ outputted from the another supply voltage generator is greater than 16V. The another supply voltage generator may have the same functionality as the supply voltage generator 114 in the first embodiment shown in FIG. 1. For example, the another supply voltage generator may use a set of battery cells (not shown in FIG. 10; e.g. the set of battery cells {B1, B2, B3, B4} shown in FIG. 1) as a power source, which may be further converted into voltage(s) required by certain internal elements within the another supply voltage generator. In other words, in a case where the power supply device lacks an external power source, the another supply voltage generator may provide a steady supply voltage (e.g. the supply voltage $V_S$) to the voltage divider circuit and the Zener diode 512 in order to maintain the operations of the virtual battery cell simulation circuit 510. The resistor $R_E$ may be used to limit a current magnitude. Additionally, the voltage divider circuit formed by the resistors {$R_D$} may perform voltage division in order to generate voltage levels 12.8V, 9.6V, 6.4V and 3.2V required by the control terminals VB4, VB3, VB2 and VB1, respectively. As the control terminal VB0 is connected to ground, the voltage level thereof is a ground level (0V in this embodiment). Hence, the aforementioned method for performing the battery cell control with aid of the virtual battery mechanism may further include the following steps: utilizing the breakdown voltage characteristics of the Zener diode 512 to generate a virtual total output voltage level (e.g. 16V), wherein the virtual total output voltage level simulates an output voltage level of connecting a set of virtual battery cells (e.g. the five battery cells $B_{VIR1}$, $B_{VIR2}$, $B_{VIR3}$, $B_{VIR4}$ and $B_{VIR5}$) in series; and utilizing the battery cell control chip 120 within the power supply device to control operations of the set of virtual battery cells according to the virtual total output voltage level. Specifically, the aforementioned method for performing the battery cell control with aid of the virtual battery mechanism may further include the following step: using a voltage divider circuit (e.g. the voltage divider circuit formed by the resistors $\{R_D\}$) to perform voltage division according to the virtual total output voltage level in order to generate a voltage level required by at least one control terminal of the battery cell control chip 120 (e.g. one of the control terminals VB4, VB3, VB2 and VB1), wherein the voltage level is provided for simulating the operations of the set of virtual battery cells. For the sake of brevity, similar descriptions are not repeated here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing battery cell control with aid of virtual battery mechanism, the method being applied to a power supply device, the method comprising:
   receiving a total output voltage level of a set of battery cells connected in series between a first battery control terminal and a second battery control terminal of a battery cell control chip within the power supply device;
   generating a virtual total output voltage level according to the total output voltage level, and inputting the virtual total output voltage level to a third battery control terminal of the battery cell control chip different from the second battery control terminal, wherein the virtual total output voltage level simulates an output voltage level of connecting the set of battery cells and at least one virtual battery cell in series between the first battery control terminal and the third battery control terminal;
   generating a supply voltage according to the total output voltage level, and maintaining generation of the virtual total output voltage level according to the supply voltage; and
   utilizing the battery cell control chip within the power supply device to control operations of the set of battery cells according to the virtual total output voltage level.

2. The method of claim 1, wherein the supply voltage is greater than the virtual total output voltage level.

3. The method of claim 1, wherein the step of generating the virtual total output voltage level according to the total output voltage level comprises:
   dynamically adjusting the virtual total output voltage level to maintain a ratio of the virtual total output voltage level to the total output voltage level in order to simulate a voltage across the virtual battery cell, wherein the simulated voltage across the virtual battery cell approaches an average value of voltages across individual battery cells in the set of battery cells.

4. The method of claim 1, wherein the step of generating the virtual total output voltage level according to the total output voltage level comprises:
   using a virtual battery cell simulation circuit to convert the total output voltage level into the virtual total output voltage level, wherein the virtual battery cell simulation circuit comprises an operational amplifier and a plurality of resistors, a first input terminal of the operational amplifier is coupled to the total output voltage level, an output terminal is used to output the virtual output voltage level, and the operational amplifier is biased by the supply voltage to maintain the generation of the virtual total output voltage level.

5. The method of claim 1, wherein the battery cell control chip further comprises at least one other battery control terminal; and the step of receiving the total output voltage level of the set of battery cells connected in series between the first battery control terminal and the second battery control terminal comprises:
   electrically connecting terminals of individual battery cells of the set of battery cells to the first battery control terminal, the at least one other battery control terminal and the second battery control terminal in order to electrically connect the set of battery cells in series between the first battery control terminal and the second battery control terminal; and
   receiving the total output voltage level of the set of battery cells through the second battery control terminal.

6. The method of claim 1, further comprising:
   utilizing another battery cell control chip within the power supply device to control operations of another set of battery cells connected in series within the power supply device according to an output voltage level of a specific battery cell in the set of battery cells, wherein a predetermined number of battery cells supported by the another battery cell control chip is greater than a number of battery cells of the another set of battery cells.

7. The method of claim 6, further comprising:
   connecting the set of battery cells and the another set of battery cells in series; and
   selecting a battery cell in the set of battery cells as the specific battery cell, wherein the battery cell is directly connected in series with the another set of battery cells.

8. The method of claim 1, wherein a predetermined number of battery cells supported by the battery cell control chip is greater than a number of battery cells of the set of battery cells.

9. An apparatus for performing battery cell control with aid of virtual battery mechanism, the apparatus comprising at least a portion of a power supply device, the apparatus comprising:
   a battery cell control chip, comprising a first battery control terminal, a second battery control terminal and a third battery control terminal, the battery cell control chip arranged for controlling operations of a set of battery cells connected in series between the first battery control terminal and the second battery control terminal according to a virtual total output voltage level, wherein the virtual total output voltage level simulates an output voltage level of connecting the set of battery cells and at least one virtual battery cell in series between the first battery control terminal and the third battery control terminal;
   a virtual battery cell simulation circuit, electrically connected to the battery cell control chip, the virtual battery cell simulation circuit arranged for receiving a total output voltage level of the set of battery cells connected in series between the first battery control terminal and the second battery control terminal, generating the virtual total output voltage level according to the total output voltage level, and inputting the virtual total output voltage level to the third battery control terminal; and a supply voltage generator, electrically connected to the virtual battery cell simulation circuit, the supply voltage generator arranged for generating a supply voltage according to the total output voltage level, and maintaining generation of the virtual total output voltage level according to the supply voltage.

10. The apparatus of claim 9, wherein the supply voltage is greater than the virtual total output voltage level.

11. The apparatus of claim 10, wherein the resistors comprises:
a first resistor, wherein two terminals of the first resistor are electrically connected to the second input terminal and the output terminal of the operational amplifier, respectively; and
a second resistor, wherein two terminals of the second resistor are electrically connected to the second input terminal and a reference voltage level of the operational amplifier, respectively.

12. The apparatus of claim 9, wherein the virtual battery cell simulation circuit comprises:
an operational amplifier, wherein the virtual battery cell simulation circuit converts the total output voltage level into the virtual total output voltage level with aid of operations of the operational amplifier; the operational amplifier comprises a first input terminal, a second input terminal and an output terminal; the first input terminal is coupled to the total output voltage level; the output terminal is used to output the virtual output voltage level; and the operational amplifier is biased by the supply voltage to maintain the generation of the virtual total output voltage level; and
a plurality of resistors, electrically connected to the operational amplifier, the resistors arranged for determining a ratio of the virtual total output voltage level to the total output voltage level in order to simulate a voltage across the virtual battery cell, wherein the simulated voltage across the virtual battery cell approaches an average value of voltages across individual battery cells in the set of battery cells.

13. The apparatus of claim 9, wherein the battery cell control chip further comprises at least one other battery control terminal; terminals of individual battery cells of the set of battery cells are electrically connected to the first battery control terminal, the at least one other battery control terminal and the second battery control terminal; and the virtual battery cell simulation circuit receives the total output voltage level of the set of battery cells through the second battery control terminal.

14. The apparatus of claim 9, further comprising:
another battery cell control chip, for controlling operations of another set of battery cells connected in series within the power supply device according to an output voltage level of a specific battery cell in the set of battery cells, wherein a predetermined number of battery cells supported by the another battery cell control chip is greater than a number of battery cells of the another set of battery cells.

15. The apparatus of claim 14, wherein the set of battery cells is connected in series with the another set of battery cells, and the specific battery cell is directly connected in series with the another set of battery cells.

16. The apparatus of claim 9, wherein a predetermined number of battery cells supported by the battery cell control chip is greater than a number of battery cells of the set of battery cells.

17. A method for performing battery cell control with aid of virtual battery mechanism, the method being applied to a power supply device, the method comprising:
utilizing breakdown voltage characteristics of a Zener diode to generate a virtual total output voltage level, wherein the virtual total output voltage level simulates an output voltage level of connecting a set of virtual battery cells in series;
generating a supply voltage to maintain generation of the virtual total output voltage level; and
utilizing a battery cell control chip within the power supply device to control operations of the set of virtual battery cells according to the virtual total output voltage level.

18. The method of claim 17, wherein the supply voltage is greater than the virtual total output voltage level.

19. The method of claim 17, further comprising:
using a voltage divider circuit to perform voltage division according to the virtual total output voltage level in order to generate a voltage level required by at least one control terminal of the battery cell control chip, wherein the voltage level is provided for simulating the operations of the set of virtual battery cells.

* * * * *